G. B. CUBBERLEY.
METAL DRILL BITS.
No. 180,554. Patented Aug. 1, 1876.
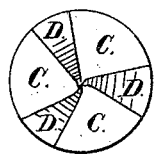
Fig. 1.
Fig. 2.
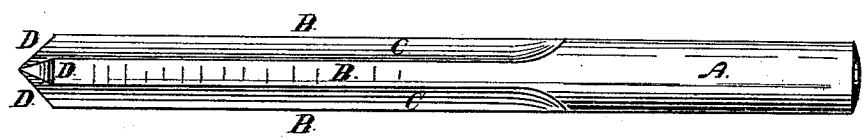
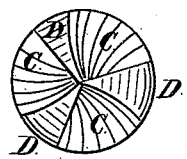
Fig. 3.
Fig. 4.
WITNESSES:
INVENTOR:

UNITED STATES PATENT OFFICE.

GARRETT B. CUBBERLEY, OF MILWAUKEE, WISCONSIN, ASSIGNOR TO JAMES P. THOMPSON, OF SAME PLACE.

IMPROVEMENT IN METAL-DRILL BITS.

Specification forming part of Letters Patent No. 180,554, dated August 1, 1876; application filed April 20, 1876.

*To all whom it may concern:*

Be it known that I, GARRETT B. CUBBERLEY, of the city of Milwaukee, in the county of Milwaukee and State of Wisconsin, have invented certain new and useful Improvements in Metal-Drills; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in both straight and spiral flanged metal-drills, and consists in a drill constructed with three parallel longitudinal or spiral-shaped grooves instead of one or two grooves, as in ordinary drills, through which grooves the drillings or waste metal escape, and three parallel longitudinal or spiral-shaped flanges at equal distances apart, all uniting at a common center, the object of the three flanges being to prevent the possibility of the drill wabbling or running to one side of the center-point, thereby obviating the difficulty met with in the common one and two flanged drills.

The claim and engravings will further explain the nature of this invention.

Figure 1 of the accompanying drawings is an end view of the straight-flanged drill. Fig. 2 is a side view of the same. Fig. 3 is an end view of the spirally-flanged drill. Fig. 4 is a side view of the same.

Similar letters of reference indicate corresponding parts.

A, in the accompanying drawings, is the shank of the drill. B B B are the flanges. C C C are the grooves. D D D are the cutting-lips of the drill, which unite at their common center and form a sharp point, and by which peculiar arrangement they are more easily sharpened and kept in order than are ordinary drills.

My drills are made as follows, to wit: A bar of steel, of the length and diameter desired, is first grooved, as shown in Fig. 2. C C C, shown in Fig. 1, represent an end view of the three longitudinal grooves, which are cut at equal distances apart on the surface of the bar, leaving between each groove the flanges B B B, which are turned to a point, forming the cutting-lips D D D. A drill made as thus described is represented by Fig. 2. The drill represented by Fig. 4 is made in the same manner, when it is then heated and twisted bodily to the spiral shape shown.

It is obvious that in constructing drills in the manner described the grooves are not cut across the grain of the steel bar, as is the case in common spiral-cut drills, the grooves of which are cut spirally in the first instance, thereby cutting across the grain of the steel, which materially affects their strength.

It has also been observed that drills constructed by the described process of twisting have a much better cutting-edge than those made by the common process of cutting.

I claim as my invention—

The improved drill-bit, the same having three longitudinal angular grooves converging toward and separated by a slender central core of stock, and whose sides or walls are—viewed in cross-section—in equi-angular planes, substantially as described and shown.

In testimony that I claim the foregoing as my own I affix my signature in presence of two witnesses.

GARRETT B. CUBBERLEY.

Witnesses:
K. SHAWVAN,
M. H. RIDDELL.